(12) United States Patent    (10) Patent No.: US 8,529,000 B2
Lim et al.    (45) Date of Patent: Sep. 10, 2013

(54) SHELF ASSEMBLY FOR A REFRIGERATOR

(75) Inventors: Jae Hoon Lim, Suwon-si (KR); In Yong Hwang, Jeonju-si (KR); Woo Yeol Yoo, Gwangju (KR); Jong Eun Chae, Gwangju (KR); Sun Keun Lee, Gwangju (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 378 days.

(21) Appl. No.: 12/923,489

(22) Filed: Sep. 23, 2010

(65) Prior Publication Data

US 2011/0079039 A1    Apr. 7, 2011

(30) Foreign Application Priority Data

Oct. 1, 2009 (KR) .............................. 10-2009-94115

(51) Int. Cl.
*A47B 96/02* (2006.01)
(52) U.S. Cl.
USPC ........................................................ 312/408
(58) Field of Classification Search
USPC .... 312/408, 404, 351, 401, 410; 211/126.15, 211/90.01, 90.04, 153, 193; 248/235, 250; 108/106, 107, 108, 147.17, 184; 62/465, 62/382; 52/202, 203, 208

See application file for complete search history.

(56) References Cited

U.S. PATENT DOCUMENTS

| | | | | |
|---|---|---|---|---|
| 4,259,135 A * | 3/1981 | Kulla | ............................. | 156/293 |
| 4,934,541 A | 6/1990 | Bussan et al. | | |
| 5,516,204 A * | 5/1996 | Calvert et al. | .................. | 312/408 |
| 5,735,589 A | 4/1998 | Herrmann et al. | | |
| 5,944,324 A * | 8/1999 | Schultheis et al. | ............. | 277/637 |
| 2001/0033097 A1 * | 10/2001 | Nozaki | ..................... | 296/216.09 |
| 2004/0056575 A1 * | 3/2004 | Dietz et al. | ..................... | 312/408 |
| 2005/0258725 A1 * | 11/2005 | Jang | .............................. | 312/408 |
| 2006/0254481 A1 * | 11/2006 | Lee et al. | ....................... | 108/108 |
| 2010/0052491 A1 * | 3/2010 | Vardon | .......................... | 312/408 |
| 2010/0102693 A1 * | 4/2010 | Driver et al. | .................. | 312/408 |

FOREIGN PATENT DOCUMENTS

WO    WO 2006044641 A2 *    4/2006

* cited by examiner

*Primary Examiner* — James O Hansen
*Assistant Examiner* — Sasha T Varghese
(74) *Attorney, Agent, or Firm* — Staas & Halsey LLP

(57) ABSTRACT

A shelf assembly for a refrigerator comprises upper and lower frames wherein the upper and lower frames enclose a peripheral edge of a supporting plate, each frame includes a groove to receive a sealing member, and the frames are preassembled through locking parts, and then fusion-bonded in the preassembled state. Accordingly, a waterproof effect and durability of the shelf assembly are improved.

15 Claims, 12 Drawing Sheets

(a)

(b)

(c)

(d)

SHELF ASSEMBLY FOR A REFRIGERATOR

CROSS-REFERENCE TO RELATED APPLICATIONS

This application claims the benefit of Korean Patent Application No. 2009-0094115, filed on Oct. 1, 2009 in the Korean Intellectual Property Office, the disclosure of which is incorporated herein by reference.

BACKGROUND

1. Field

Embodiments relate to a shelf mounted in a refrigerator.

2. Description of the Related Art

Generally, a refrigerator refers to an apparatus to preserve food freshly at a low temperature by supplying cold air to a storage chamber wherein the food is stored. Such a refrigerator includes a freezing chamber, an inner temperature of which is kept below freezing, and a refrigerating chamber, an inner temperature of which is kept slightly above freezing.

In the storage chamber, one or more shelves are provided to place food or other items thereon and thereby utilize the space of the storage chamber more efficiently.

Recently, a shelf made of a transparent tempered glass has been introduced, which is capable of supporting heavy items while enabling users to conveniently check positions of the stored items.

Various items may be placed on the shelf. Especially, these items often contain liquid. Therefore, when the user accidentally spills such items containing liquids, the liquid flows to below the shelf, thereby contaminating the storage chamber.

SUMMARY

Therefore, it is an aspect to provide a shelf assembly for a refrigerator, having an improved sealing structure, durability, and assembly efficiency.

Additional aspects of the invention will be set forth in part in the description which follows and, in part, will be apparent from the description, or may be learned by practice of the invention.

In accordance with one aspect, a shelf assembly for a refrigerator includes a supporting plate; an upper frame enclosing an upper part of a peripheral edge of the supporting plate and including an upper groove spaced apart from the peripheral edge of the supporting plate; a lower frame enclosing a lower part of the peripheral edge of the supporting plate and including a lower groove spaced apart from the peripheral edge of the supporting plate; and a sealing member receiving part generated by the upper and the lower grooves as the upper and the lower frames are interconnected, thereby receiving the peripheral edge of the supporting plate, wherein the supporting plate and the upper and the lower frames may be fusion-bonded to one another, and the sealing member receiving part may receive a sealing member sealed and bonded to at least one of the supporting plate, the upper frame and the lower frame.

The sealing member receiving part may further include at least one position fixing protrusion protruded from an inner wall thereof at a position facing an end of the supporting plate.

The upper and the lower frames may include locking parts fixing the upper and the lower frames, respectively, so that the supporting plate and the upper and the lower frames may be maintained in a preassembled state before being fusion-bonded.

The lower groove may be formed as a recessed groove between a lower supporting stage and a stepped stage, the lower supporting stage being extended upward from an inside of an upper surface of the lower frame to support one side of the supporting plate and the stepped stage which is disposed at a predetermined interval from the lower supporting stage and stepped at an outer part of the upper surface of the lower frame.

The upper groove may be formed as a recessed groove between an upper supporting stage and an upper sealing member leakage prevention stage, the upper supporting stage being extended downward from an inside of a lower surface of the upper frame to support the other side of the supporting plate, and the upper sealing member leakage prevention stage being disposed at a predetermined interval from the upper supporting stage and extended from an outer part of the lower surface of the upper frame toward the stepped stage to be fusion-bonded with the lower frame.

The sealing member may be formed in the lower groove to seal the lower frame and a lower surface of the supporting plate to each other.

The sealing member may be formed in the upper groove to seal the upper frame and an upper surface of the supporting plate to each other.

The sealing member may seal one sidewall of the upper and lower grooves and an end of the supporting plate to each other.

The sealing member leakage prevention stage may include at least one position fixing protrusion extended toward the end of the supporting plate.

The shelf assembly may further include a lower cover flange formed at an outer part of the lower frame and extended upward from one end of the stepped stage to be fusion-bonded to the upper frame; and an upper cover flange extended downward from an outer part of the upper frame to enclose an outer surface of the lower cover flange at a predetermined interval from the upper sealing member leakage prevention stage.

According to another embodiment, a shelf assembly for a refrigerator includes a supporting plate made of tempered glass; upper and lower frames disposed at upper and lower parts of the supporting plate to enclose a peripheral edge of the supporting plate, and fusion-bonded to each other; a sealing member receiving part generated by the upper and the lower grooves recessed along peripheries of the upper and the lower frames, respectively, to receive part of the peripheral edge of the supporting plate; an adhesive-type sealing member sealed and bonded to at least one of the peripheral edge of the supporting plate, the upper frame and the lower frame; at least one position fixing protrusion protruded from one side of an inner wall of the sealing member receiving part toward an end of the supporting plate; and locking parts formed respectively at the upper and the lower frames to fix the upper and the lower frames in a preassembled state before the frames are fusion bonded.

The sealing member may be omitted from at least one part of the lower groove.

The locking parts may include a locking hook disposed at any one of the upper and the lower frames, and a locking recess disposed at the other end of the upper and the lower frames to be engaged with and supported by the locking hook.

In accordance with another aspect, a method of manufacturing a shelf assembly for a refrigerator includes preparing a supporting plate, and upper and lower frames each including a groove to receive a sealing member; fixing any one of the upper and the lower frames; applying the sealing member in the groove of the fixed frame; seating the supporting plate on an upper part of the fixed frame so that a peripheral edge of the supporting plate is partially received in the groove of the fixed frame; placing the other frame which is not yet fixed, on the upper part of the fixed frame including the supporting plate seated thereon, and fixedly preassembling the upper and the lower frames; and fusion-bonding the preassembled supporting plate, and the upper and the lower frames to one another.

The seating of the supporting plate on the upper part of the fixed frame may include bringing an end of the supporting plate into contact with at least one position fixing protrusion protruded from an inner wall of the groove of the fixed frame.

The preassembling of the upper and the lower frames may include bringing the locking hook formed at any one of the upper and the lower frames into engagement with the locking recess formed at the other one of the upper and the lower frames so that the locking hook is supported by the locking recess.

The fusion bonding may include an ultrasonic fusion bonding process.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
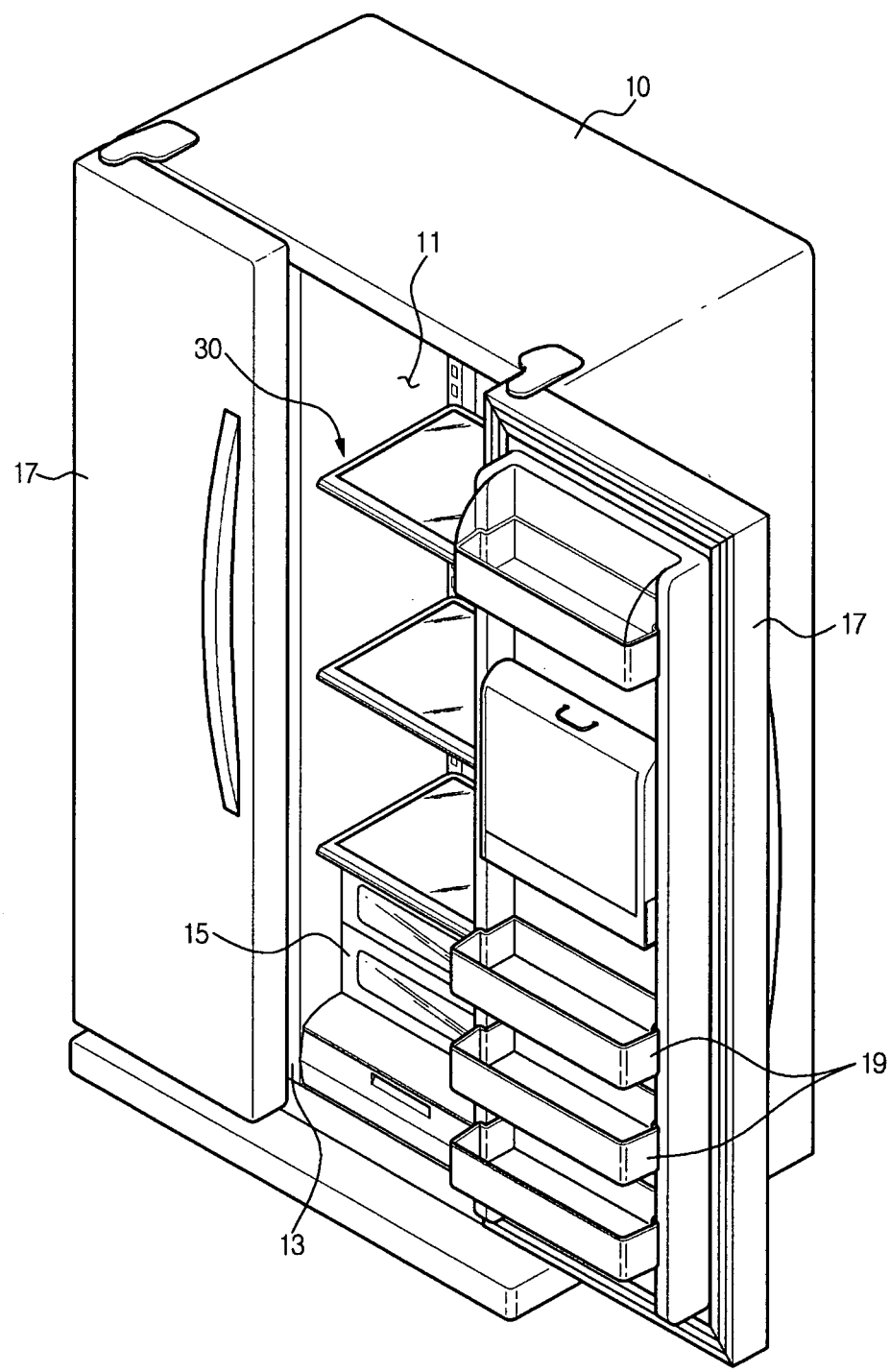
FIG. 1 is a perspective view schematically showing the structure of a refrigerator according to one embodiment.

Reference will now be made in detail to the embodiments of the present invention, examples of which are illustrated in the accompanying drawings, wherein like reference numerals refer to like elements throughout.

Figure 2:
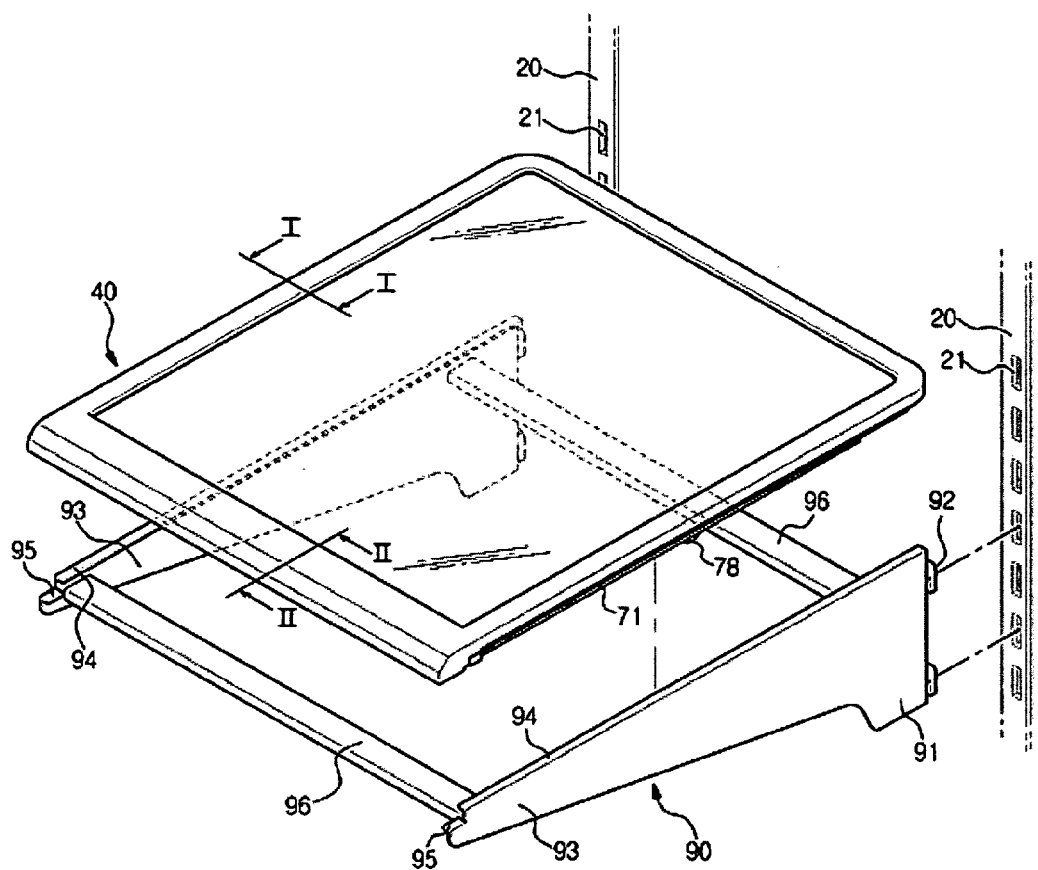
FIG. 2 is a perspective view showing the structure of a shelf assembly according to the embodiment.

FIG. 1 is a perspective view schematically showing the structure of a refrigerator according to one embodiment. FIG. 2 is a perspective view showing the structure of a shelf assembly according to the embodiment.

Referring to FIG. 1, the refrigerator includes a main body 10 holding a storage chamber 11 therein, and a door 17 opening and closing the storage chamber 11.

Although the storage chamber 11 shown in FIG. 1 is separated into the left and the right of the main body 10 by a partition 13, the storage chamber 11 may be separated into upper and lower parts of the main body 10 or formed as one solid space. The storage chamber 11 may be used as a refrigerating chamber or a freezing chamber.

A plurality of door guards 19 may be formed on an inner wall of the door 17 to receive relatively small food and beverage bottles.

A drawer-type container 15 may be mounted at a lower part of the storage chamber 11 to store fruits and vegetables. Also, a plurality of shelf assemblies 30 may be mounted at an upper part of the storage chamber 11, being spaced by intervals in a vertical direction.

The shelf assemblies 30 may be fixed in the storage chamber 11 to partition the inside of the storage chamber 11 into multiple spaces to improve the space efficiency of the storage chamber 11.

Referring to FIG. 2, each of the shelf assemblies 30 includes a shelf 40 on which items are placed, and a shelf supporting member 90 supporting the shelf 40.

The shelf supporting member 90 includes fixing parts 91 fixed to a pair of supporting frames 20 mounted on both sides of an inner rear wall of the storage chamber 11, supporting parts 93 extended to the front from the respective fixing parts 91 to support the shelf 40, and connection parts 96 interconnecting the supporting parts 93 disposed at the both sides.

Each of the supporting frames 20 may include a plurality of hook recesses 21 to mount the shelf supporting member 90 thereto, being arranged at intervals in a vertical direction.

Each of the fixing parts 91 may have one or more hook parts 92 engaged with and supported by the hook recesses 21.

According to this structure, the shelf supporting member 90 may be mounted by hooking the hook parts 92 into the hook recesses 21. Also, the mounting position of the shelf supporting member 90 may be varied by adjusting connection positions of the hook parts 92 in the up and down direction.

The supporting parts 93 are structured to support the shelf 40 seated thereon and enable the shelf 40 to slide forward and backward.

Figure 3:
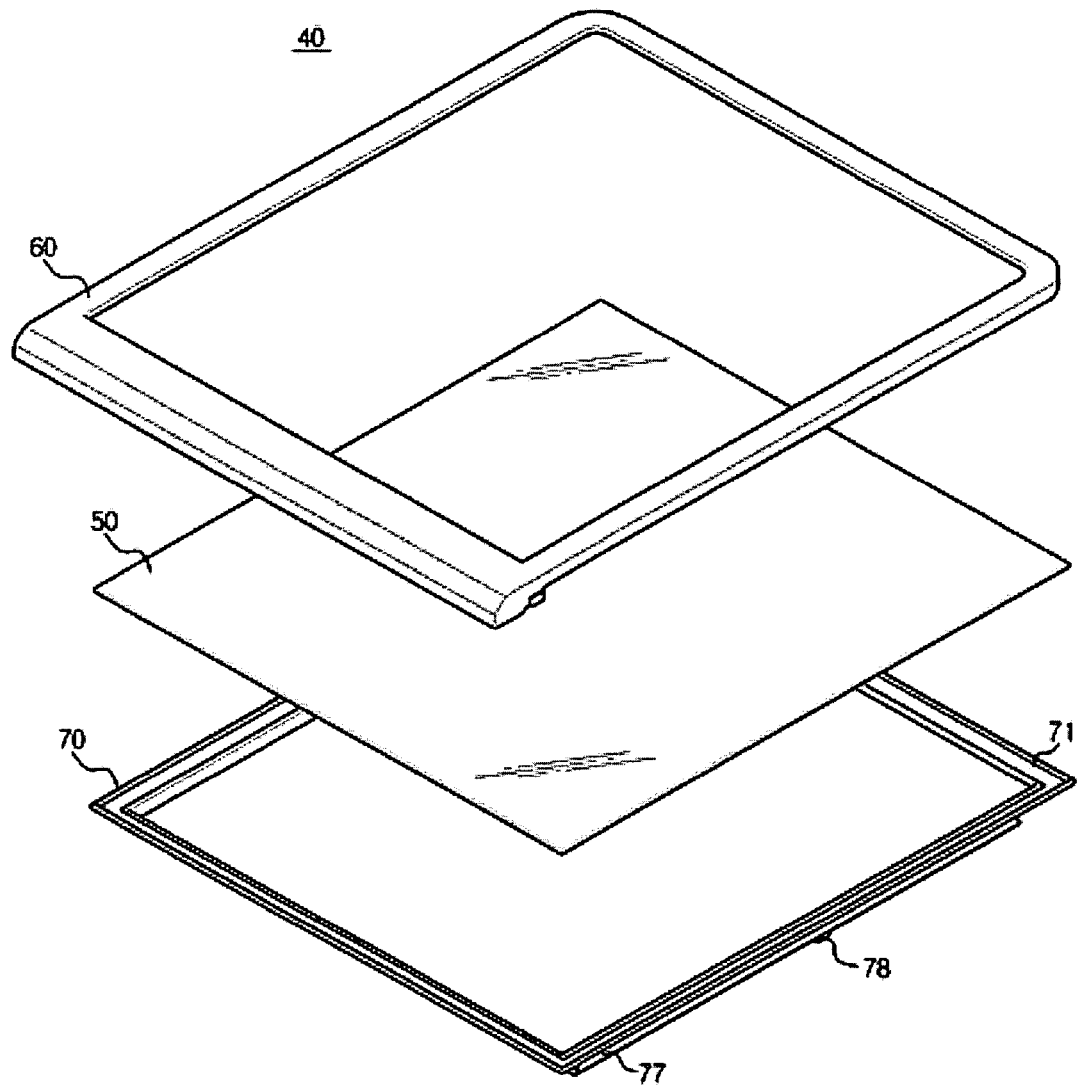
FIG. 3 is an exploded perspective view of the shelf assembly.
Figure 4:
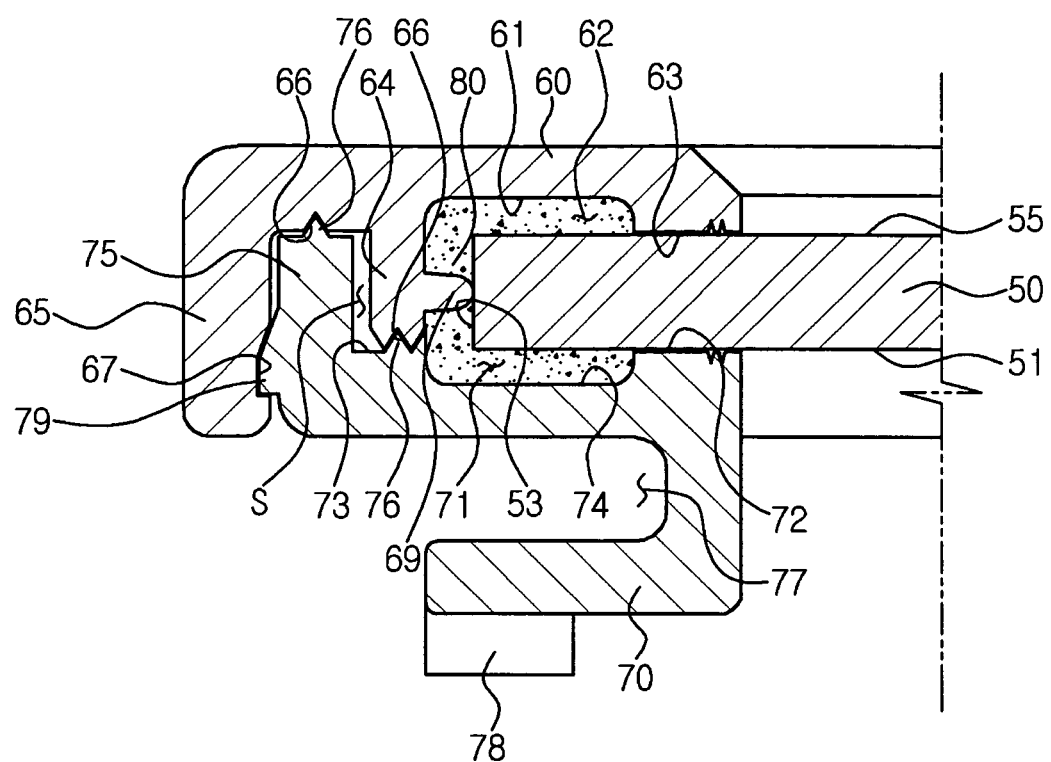
FIG. 4 is a sectional view of FIG. 2, cut along a line I-I.
Figure 5:
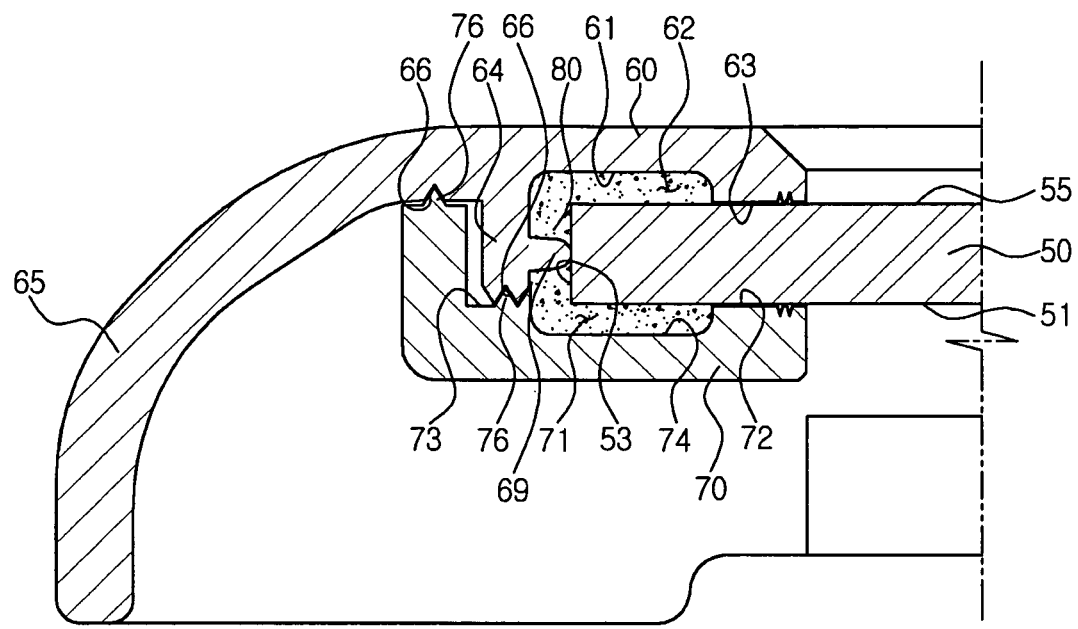
FIG. 5 is a sectional view of FIG. 2, cut along a line II-II.

FIG. 3 is an exploded perspective view of the shelf assembly. FIG. 4 is a sectional view of FIG. 2, cut along a line I-I, and FIG. 5 is a sectional view of FIG. 2, cut along a line II-II.

Referring to FIG. 3, the shelf 40 is constituted by a supporting plate 50, and upper and lower frames 60 and 70 respectively disposed at upper and lower parts of the supporting plate 50 while enclosing the peripheral edge of the supporting plate 50.

The supporting plate 50 to place stuffs to be stored thereon may be formed of a transparent tempered glass or synthetic resin.

The upper and the lower frames 60 and 70 may take the form of a rectangular frame which is opened through the center corresponding to the peripheral edge of the supporting plate 50.

A sealing member 80 is provided to waterproof the supporting plate 50 and the upper and the lower frames 60 and 70 enclosing the supporting plate 50. A silicon adhesive may be used as the sealing member 80.

An antibacterial material may be added in a small amount to the sealing member 80, in order to suppress inhabitation of bacteria and mold.

Referring to FIG. 4, as the upper frame 60 and the lower frame 70 are fusion-bonded to each other, an upper groove 62 formed at the upper frame 60 and a lower groove 71 formed at the lower frame 70 become sealing member receiving parts 62 and 71.

The lower groove 71 is formed as a recessed groove between a lower supporting stage 72 and a stepped stage 73. The lower supporting stage 72 is extended upward from an inside of an upper surface 74 of the lower frame 70 to support a lower surface 51 of the supporting plate 50. The stepped stage 73 is disposed at a predetermined interval from the lower supporting stage 72, being stepped at an outer part of the upper surface 74 of the lower frame 70.

When the supporting plate 50 is connected to the lower frame 70, the lower surface 51 of the supporting plate 50 is seated on the lower supporting stage 72 while an end 53 of the supporting plate 50 is disposed at a predetermined interval from the stepped stage 73.

When the adhesive-type sealing member 80 is received and cured in the lower groove 71, the lower frame 70 and the supporting plate 50 are bonded and sealed to each other.

In addition, a lower cover flange 75 may be formed at an outer part of the lower frame 70. The lower cover flange 75 is extended upward from one end of the stepped stage 73 to be fusion-bonded to the upper frame 60.

A fusion protrusion 76 may be formed on an upper surface of the lower cover flange 75 and on an upper surface of the stepped stage 73. The fusion protrusions 76 melt when fusion-bonded to the upper frame 60.

As shown in FIG. 3, the upper frame 60 may be a rectangular frame having an opening in the center corresponding to the peripheral edge of the supporting plate 50.

Referring to FIG. 4, the upper groove 62 is formed along the periphery of the upper frame 60 to receive the sealing member 80.

The upper groove 62 is formed as a recessed groove between an upper supporting stage 63 and an upper sealing member leakage prevention stage 64. The upper supporting stage 63 is extended downward from an inside of a lower surface 61 of the upper frame 60 to support an upper surface 55 of the supporting plate 50. The upper sealing member leakage prevention stage 64 is disposed at a predetermined interval from the upper supporting stage 63, being extended from an outer part of the lower surface 61 of the upper frame 60 up to the stepped stage 73 of the lower frame 70.

When the supporting plate 50 is connected to the upper frame 60, the upper surface 55 of the supporting plate 50 is seated on the upper supporting stage 63, and the end 53 of the supporting plate 50 is disposed at the predetermined interval from the upper sealing member leakage prevention stage 64.

As the adhesive-type sealing member 80 is received and cured in the upper groove 62, the upper frame 60 and the supporting plate 50 are sealed and bonded to each other.

In addition, an upper cover flange 65 may be formed at a predetermined interval from the upper sealing member leakage prevention stage 64, being extended downward from an outer part of the upper frame 60 to enclose an outer surface of the lower cover flange 75.

When the upper frame 60 and the lower frame 70 are preassembled according to the above structure, the lower cover flange 75 of the lower frame 70 is inserted in an insertion space S formed between the upper cover flange 65 and the upper sealing member leakage prevention stage 64. Thus, alignment between the upper and the lower frames 60 and 70 may be easily performed.

Furthermore, the upper and the lower frames 60 and 70 may be securely bonded to each other through two fusing surfaces formed at the upper sealing member leakage prevention stage 64 and the lower cover flange 75. Accordingly, the shelf 40 may be reinforced.

Although the upper groove 62 is formed between the upper supporting stage 63 and the upper sealing member leakage prevention stage 64 according to the embodiment shown in FIG. 4, the upper groove 62 may be formed through the upper cover flange 64 while omitting the upper sealing member leakage prevention stage 64.

When the supporting plate 50 is seated on the upper supporting stage 63 of the upper frame 60, a position fixing protrusion 69 may be formed on an inside of the upper sealing member leakage prevention stage 64 toward the end 53 of the supporting plate 50, so that the supporting plat 50 is seated at a correct position.

At least one position fixing protrusion 69 may be formed on each of four sides of the upper frame 60. If a single position fixing protrusion 69 is provided on each side, the position fixing protrusion 69 may be disposed in the middle of each side.

Therefore, movement of the supporting plate 50 seated on the upper frame 60 is restricted due to the position fixing protrusion 69. Accordingly, a position error of the supporting plate 50 generated during curing and fusing of the sealing member 80 and inferiority of the shelf 40 may be greatly reduced.

Here, the upper frame 60 contacting the lower frame 70 may include a fusion recess 66 having a corresponding shape to the fusion protrusion 76 to be melted during fusion bonding.

Also, locking parts 67 and 79 may be formed to the upper and the lower frames 60 and 70, respectively, to fix the upper and the lower frames 60 and 70 in a preassembled state before the frames 60 and 70 are fusion-bonded.

Referring to FIG. 4, the locking parts 67 and 79 may include a locking hook 79 protruded outward from an outer surface of the lower cover flange 75 and a locking recess 67 formed on an inner surface of the upper cover flange 65 and engaged with the locking hook 79 in a supporting manner, such that the upper frame 60 and the lower frame 70 are hooked to each other.

Although the locking hook 79 is formed at the lower frame 70 and the locking recess 67 is formed at the upper frame 60 in the embodiment shown in FIG. 4, the positions of the locking hook 79 and the locking recess 67 may be exchanged.

The locking hook 79 and the locking recess 67 may have any shapes so long as the preassembled state of the upper frame 60 and the lower frame 70 is maintained.

Also, the locking parts 67 and 79 for the preassembly of the upper and the lower frames 60 and 70 before the fusion bonding may be disposed only at both lateral sides of the upper and the lower frames 60 and 70, as shown in FIG. 4.

The sealing member 80 may seal gaps between the supporting plate 50 and the frames 60 and 70 so as to achieve a waterproof effect at the sealing member receiving parts 62 and 71, that is, the upper and the lower grooves 62 and 71, as the upper frame 60 and the lower frame 70 are interconnected enclosing the peripheral edge of the supporting plate 50.

When the sealing member 80 formed of the adhesive sealing substance is received and cured in the upper and the lower grooves 62 and 71, the peripheral edge of the supporting plate 50 is sealed and bonded to the upper and the lower frames 60 and 70.

According to this, liquid present on the upper surface 55 of the supporting plate 50 may be prevented from flowing to the lower surface 51 of the supporting plate 50 due to the presence of the sealing member 80 formed in the sealing member receiving parts 62 and 71.

In addition, the space receiving the sealing member 80 may be increased since the sealing member receiving parts 62 and 71 generated by the upper and the lower grooves 62 and 71 are spaced by a predetermined interval from the peripheral edge of the supporting plate 50, enclosing the overall peripheral edge of the supporting plate 50.

Therefore, when the sealing member 80 bonding the frames 60 and 70 and the supporting plate 50 is cured in the sealing member receiving parts 62 and 71, a contact area between the sealing member 80 and the shelf 40 is increased, accordingly improving durability of the shelf 40.

Therefore, although a load applied to the supporting plate 50 of the shelf 40 is increased due to items on the supporting plate 50, generation of cracks caused by deterioration of the bonding force between the supporting plate 50 and the upper and the lower frames 60 and 70 may effectively be reduced.

FIGS. 5 and 6A-6C are sectional views of FIG. 2, cut along a line II-II'. In FIG. 5, the upper cover flange 65 is bent forward from the outer part of the upper frame 60 while the locking parts 67 and 79 are omitted. Except for this, the other parts are the same as in the connection structure of the lateral side of the upper and the lower frames 60 and 70.

Figure 6A:
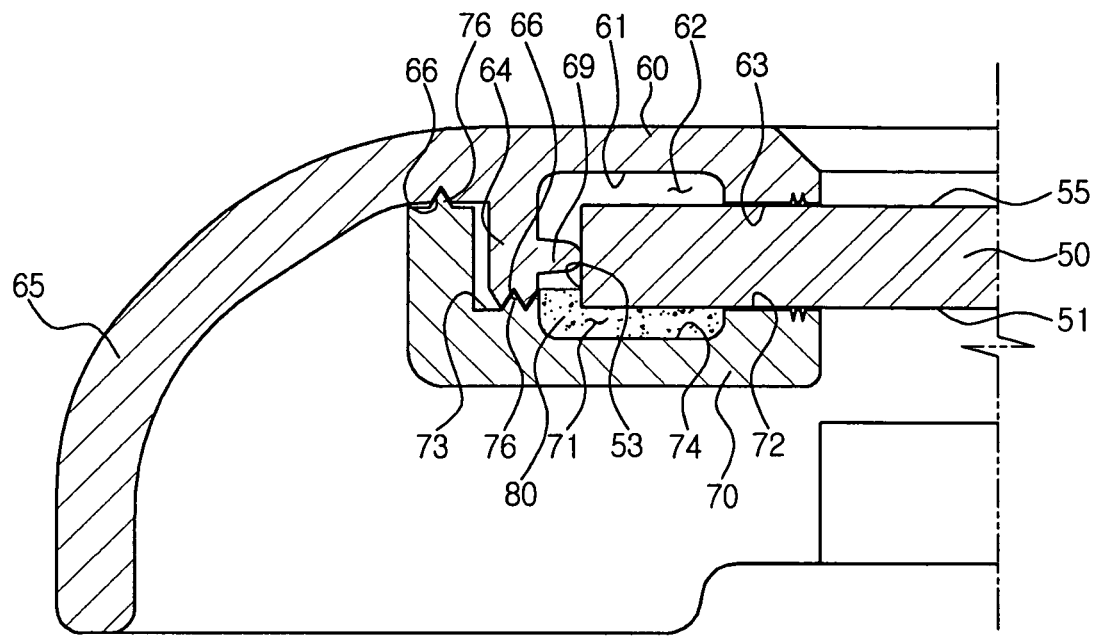
FIG. 6A to FIG. 6C are sectional views showing various examples in which a sealing member is received in upper and lower grooves, according to the embodiment.

Although the sealing member 80 fully fills the sealing member receiving parts 62 and 71 in FIGS. 4 and 5, this is only by way of example. The sealing member 80 may be received only in the lower groove 71 to seal a gap between the lower surface 51 of the supporting plate 50 and the lower frame 70 as shown in FIG. 6A, or may be received so that one sidewall of the upper and lower grooves 62 and 71 are bonded to the end 53 of the supporting plate 50 to thereby seal a gap between the end 53 and the frames 60 and 70 which face the end 53. For another example, the sealing member 80 may be received only in the upper groove 62 to seal a gap between the upper surface 55 of the supporting plate 50 and the upper frame 60 as shown in FIG. 6C.

In other words, the sealing member 80 may be formed only at a part of the sealing member receiving parts 62 and 71 to achieve fusion-bonding between the frames 60 and 70 and the supporting plate 50.

Figure 6B:
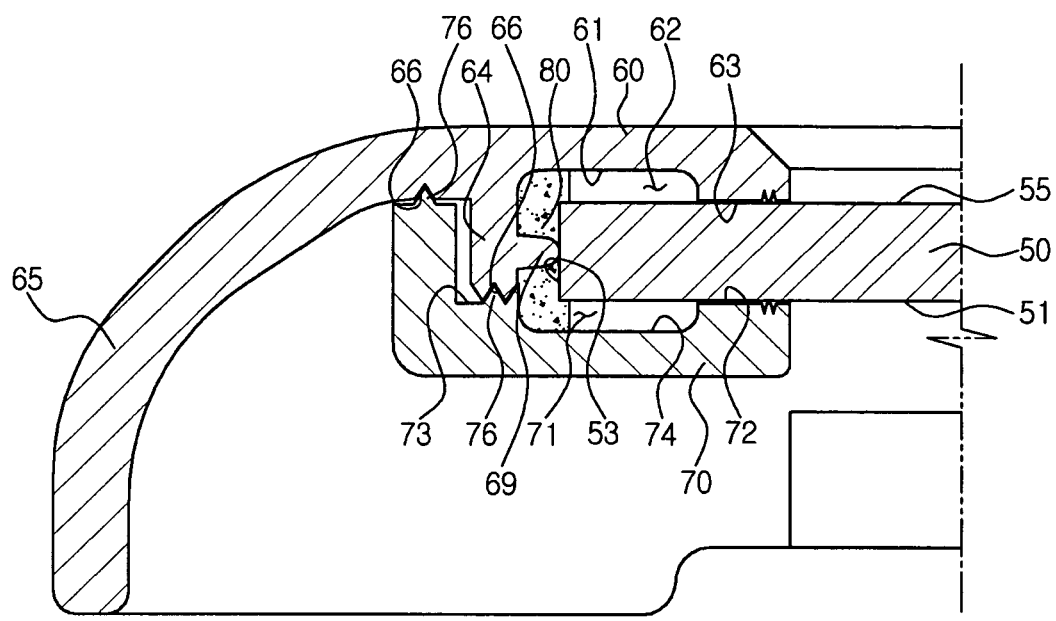
Figure 6C:
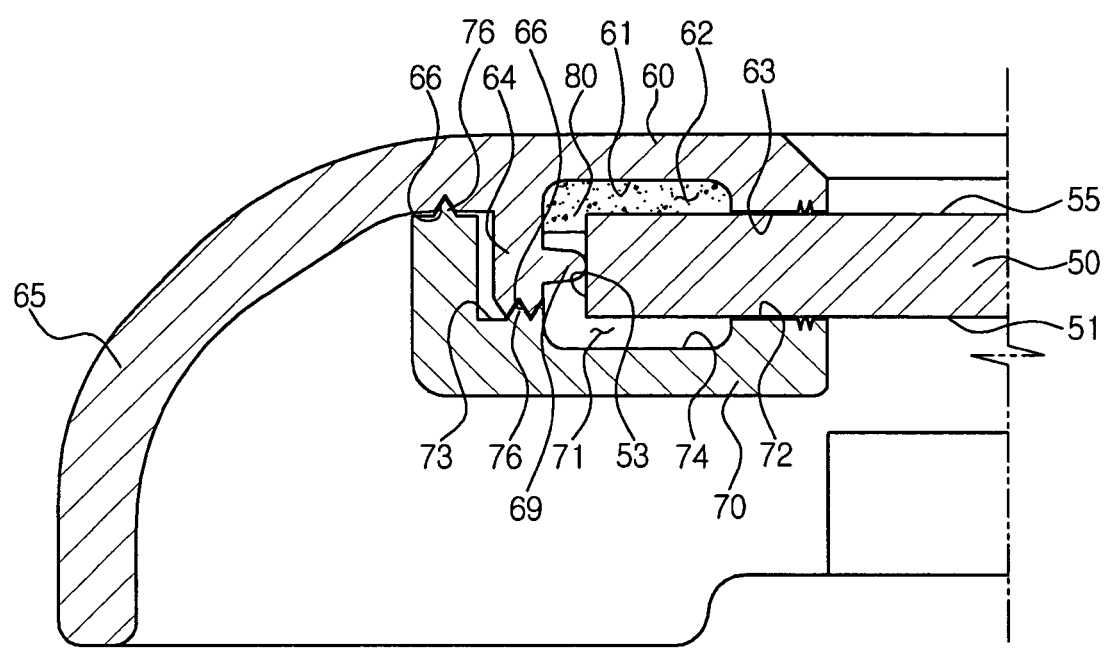

In case that the sealing member 80 is partially formed in the sealing member receiving parts 62 and 71 as shown in FIGS. 6B and 6C, the lower groove 71 forms a predetermined space.

The space of the lower groove 71 is capable of receiving liquid flowing in through cracks generated as the bonding structure among the supporting plate 50, the frames 60 and 70 and the sealing member 80 after extended use of the shelf 40, thereby preventing the liquid from flowing to below the shelf 40.

Thus, the waterproof effect of the shelf 40 is guaranteed for a long time. As a result, the reliability of the shelf 40 can be further improved.

Meanwhile, guide slots 77 may be provided at both lateral sides of the lower frame 70, as shown in FIG. 3. The guide slots 77 are engaged with guide rails 94 provided at the shelf supporting member 90, respectively, in order to enable the shelf 40 to slide along the shelf supporting member 90 between extended and retracted positions.

Figure 9:
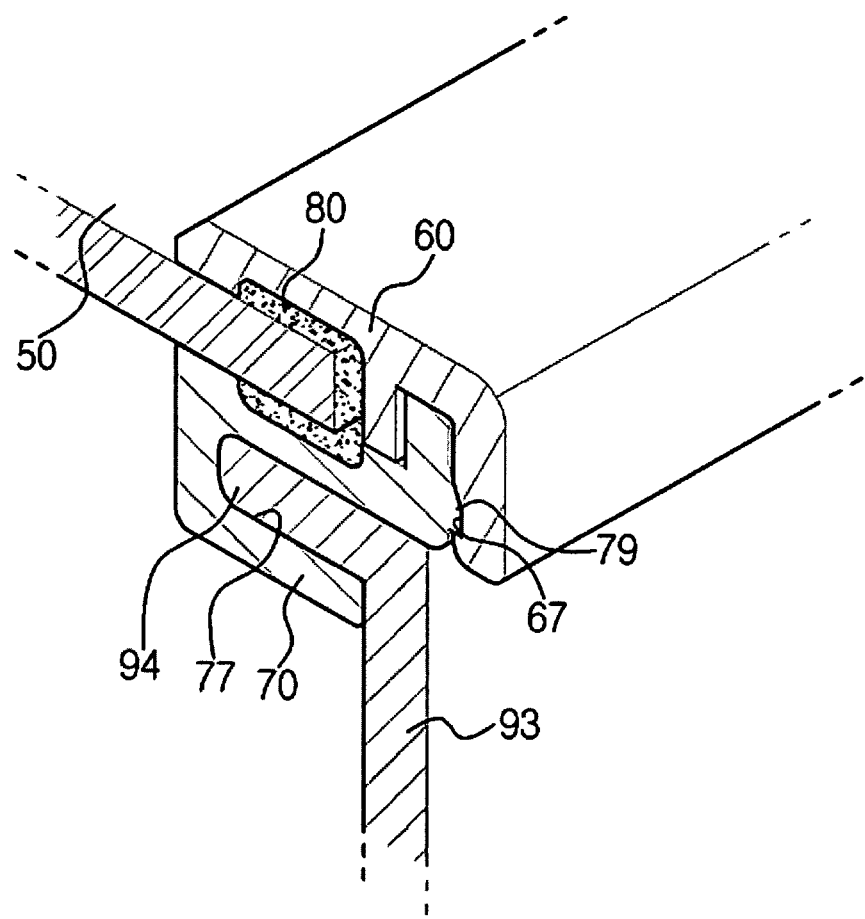
FIG. 9 is a perspective view showing a broken section of a part of the shelf assembly of the refrigerator according to the embodiment.

As shown in FIG. 9, each guide slot 77 may have a shape corresponding to the shape of each guide rail 94, which is inwardly bent from an upper end of the corresponding supporting part 93 included in the shelf supporting member 90.

Accordingly, when the user pulls the shelf 40, in order to lay an article on the shelf 40, the shelf 40 is forwardly slidably moved along the guide rails 94. In this case, the distance between the shelf 40 and the user is reduced, so that the user may easily lay an article on the shelf 40.

In order to prevent the shelf 40 from being separated from the shelf supporting member 90 when the user pulls the shelf 40, to lay an article on the shelf 40, stoppers 95 are provided at the front end of the shelf supporting member 90, as shown in FIG. 2. Each stopper 95 is inwardly bent from the upper surface of the corresponding supporting part 93. A stopper protrusion 78 may also be downwardly protruded from the lower frame 70 at one side of the lower frame 70, in order to engage with a corresponding one of the stoppers 95 when the shelf 40 is forwardly moved to a predetermined position, thereby preventing a further movement of the shelf 40.

Figure 10:
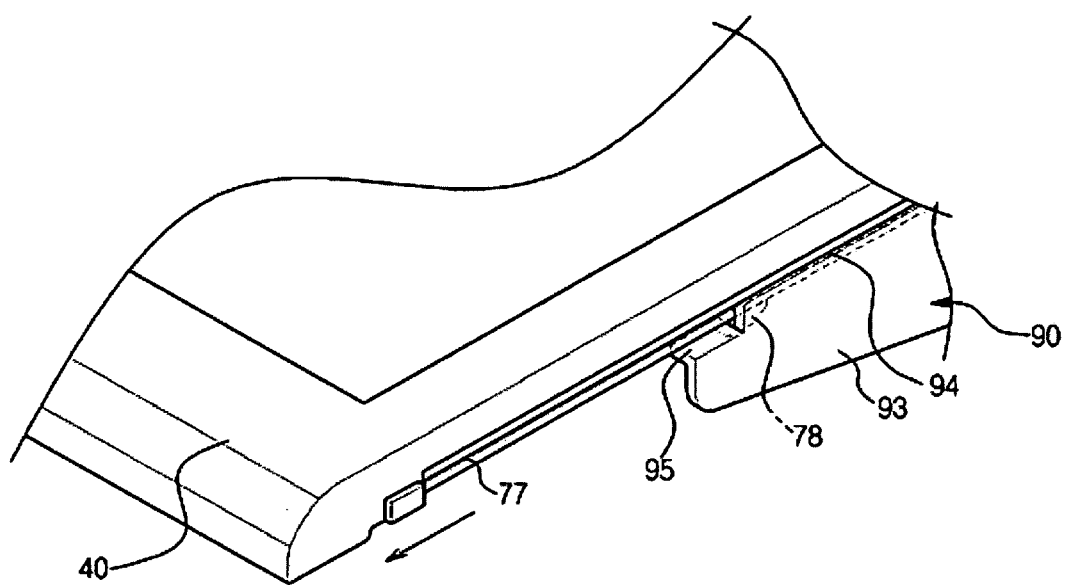
FIG. 10 is a perspective view showing an extended state of the shelf assembly of the refrigerator according to the embodiment.

That is, as shown in FIG. 10, the stopper protrusion 78 is provided at a position where the shelf 40 should be prevented from being further extended during a sliding movement thereof on the supporting parts 93, namely, a maximum extension position, in order to prevent the shelf 40 from being further moved from the maximum extension position, and thus to prevent the shaft 40 from being separated from the shelf supporting member 90.

Hereinafter, the manufacturing method and the effect of the shelf assembly for a refrigerator according to the embodiment of the present invention will be described.

First, referring to FIG. 3, the shelf 40 of the shelf assembly 30 is constructed as follows. The supporting plate 50, the upper frame 60 and the lower frame 70 are separately prepared. The upper frame 60 or the lower frame 70 is fixed using a jig (operation S1).

Here, however, it is sure that the lower frame 70 may be fixed prior to the upper frame 60 differently from the above explanation.

Figure 7:
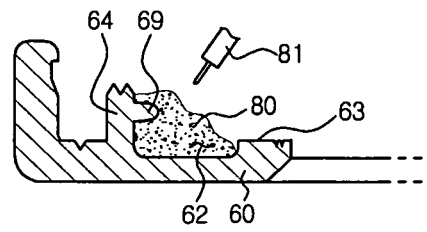
FIG. 7, parts (a)-(d), show a process view illustrating a manufacturing method of the shelf assembly for the refrigerator according to the embodiment.
Figure 7:
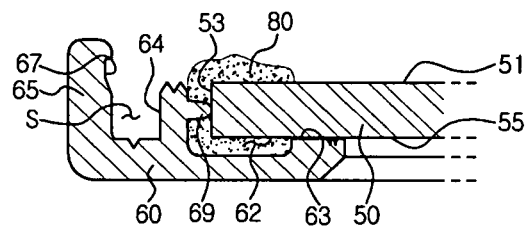
Figure 7:
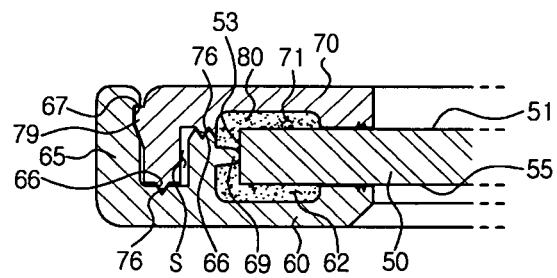
Figure 7:
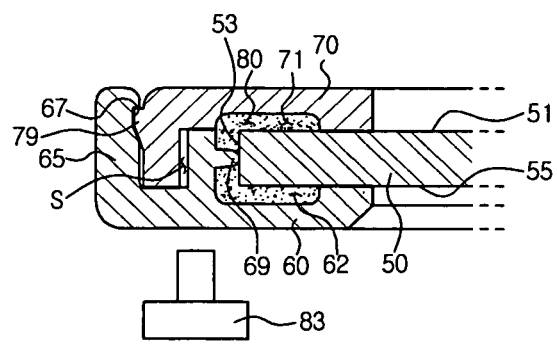
Figure 8:
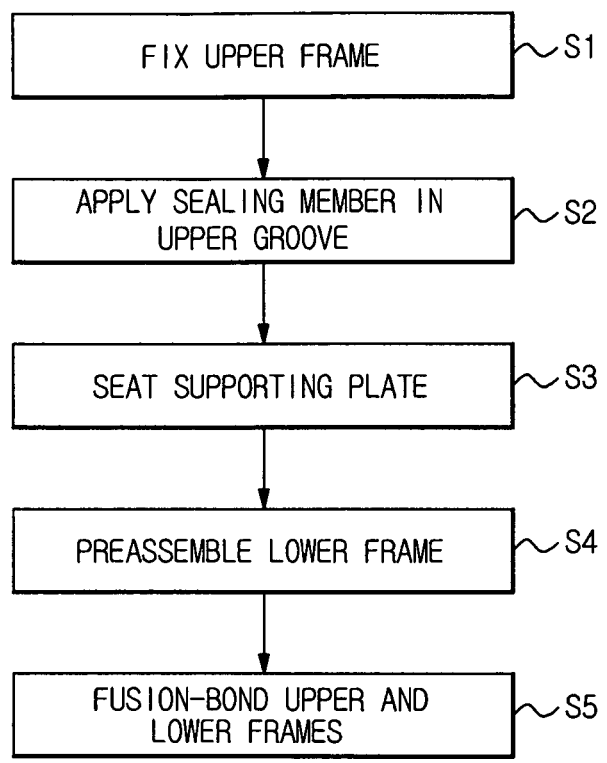
FIG. 8 is a flow chart illustrating the manufacturing method of the shelf assembly of the refrigerator.

When the upper frame 60 is fixed first, an open part of the upper groove 62 formed at the upper frame 60 is directed upward as shown in FIG. 7, part (a).

Next, the adhesive-type sealing member 80, for example, silicon, is applied in the upper groove 62 using a fixed quantity feeder 81 (operation S2).

Although it is exemplary to apply the sealing member 80 in the whole upper groove 62 to achieve a waterproof structure, the sealing member 80 may be applied in proper quantity depending on the degree of fusion.

For example, the sealing member 80 may fill the upper groove 62 to a height corresponding to the height of the upper supporting stage 63, or may be applied in a relatively large quantity near the upper sealing member leakage prevention stage 64.

As shown in FIGS. 6A to 6C, the sealing member 80 seals the gap between the supporting plate 50 and the upper frame 60, the gap between the supporting plate 50 and the lower frame 70, or the gap between the supporting plate 50 and one sidewall of the upper and lower frames 60 and 70, according to the application position of the sealing member 80.

After the sealing member 80 is applied, the supporting plate 50 is seated on the upper part of the upper frame 60 as shown in FIG. 7, part (b) (operation S3).

When the upper surface 55 of the supporting plate 50 is seated on the upper supporting stage 63, the end 53 of the supporting plate 50 is brought into contact with the position fixing protrusion 69. Therefore, the supporting plate 50 is not only disposed at the correct position but also restricted in movement.

In this state, the sealing member 80 received in the upper groove 62 is pressed against the upper surface 55 of the supporting plate 50 and therefore force-fitted in the upper groove 62. Simultaneously, part of the sealing member 80 is spread along the lower surface 51 of the supporting plate 50.

Accordingly, density of the sealing member 80 in the upper groove 62 is increased. Therefore, the sealing member 80 is brought into tight contact with the upper frame 60 and the upper surface 55 of the supporting plate 50, accordingly removing the gap.

Next, the lower frame 70 is placed on an upper part of the upper frame 60 on which the supporting plate 50 is seated. Thus, the upper frame 60 and the lower frame 70 are preassembled (operation S4).

Here, the lower cover flange 75 of the lower frame 70 is inserted in the insertion space S formed between the upper cover flange 65 and the upper sealing member leakage prevention stage 64, thereby facilitating the preassembly of the upper and the lower frames 60 and 70.

More specifically, as shown in FIG. 7, part (c), when the lower cover flange 75 of the lower frame 70 is inserted in the insertion space S, the locking hook 79 formed at the lower cover flange 75 is engaged with and supported by the locking recess 67. As a result, the upper and the lower frames 60 and 70 are tightly fixed to the supporting plate 50, and the sealing member 80 placed on the lower surface 51 of the supporting plate 50 is received in the lower groove 71.

Accordingly, the supporting plate 50 and the upper and the lower frames 60 and 70 are prevented from moving before the sealing member 80 is completely cured in the upper and the lower grooves 62 and 71, thereby preventing deterioration of the bonding force of the sealing member 80.

Moreover, since the frames 60 and 70 are preassembled maintaining the tight contact between the sealing member 80 and the supporting plate 50, the fusion bonding may be performed efficiently.

Next, the upper and the lower frames 60 and 70 are fusion-bonded using an ultrasonic fusing machine 83 (operation S5).

Specifically, ultrasonic waves are applied through the ultrasonic fusing machine 83 to contacting surfaces among the supporting plate 50, and the upper and the lower frames 60 and 70.

First, uneven parts of the fusion protrusion 76 and the fusion recess 66 formed on the contacting surfaces between the upper and the lower frames 60 and 70 are melted and fused. As the fusion process continues, the contacting surfaces between the frames 60 and 70 are fused and securely bonded to each other.

In addition, since the fusion bonding of the upper and the lower frames 60 and 70 are performed from around the supporting plate 50, distortion of the frames 60 and 70, which may be caused when the shelf 40 is formed by injection molding, is prevented.

Where the supporting plate 50 is made of tempered glass, and the upper and lower frames 60 and 70 are made of a plastic material, there may be an increased possibility of deformation of the shelf 40 caused by a thermal conductivity difference between the supporting plate 50 and the upper and lower frames 60 and 70 occurring during formation of the shelf 40 through an insert molding process. In this case, therefore, carefulness is required during the manufacture of the shelf 40, so that an increase in manufacturing costs may occur. However, where the shelf 40 is manufactured through a fusing process according to an embodiment of the present invention, it may be possible to simplify the manufacturing process and to minimize deformation of the shelf 40 caused by heat. Thus, an enhancement in productivity may be achieved.

Although the present embodiment employs the ultrasonic fusing machine 83, a vibration fusing machine may be used and, in this case, the fusion protrusion 76 and the fusion recess 66 may be omitted.

Thus, the frames 60 and 70 and the supporting plate 50 are fusion-bonded and the gaps between the frames 60 and 70 and the supporting plate 50 are sealed. Therefore, liquid present on the upper surface 55 of the supporting plate 50 will not flow toward the lower surface of the supporting plate 50.

In addition, since the adhesive-type sealing member 80 applied between the frames 60 and 70 reinforces the bonding between the frames 60 and 70, durability of the shelf 40 and reliability of the shelf assembly are improved.

That is, since the upper and lower frames 60 and 70 are coupled by the adhesive-type sealing member 80, it may be possible to minimize damage to the shelf 40 by a moment generated when an article is laid on the supporting plate 50 in a state in which the shelf 40 is extended from the shelf supporting member 90 by a maximum extension distance.

Meanwhile, even when a liquid is introduced into the groove, in which the sealing member 80 is received, there is no contamination caused by the liquid. This is because an antibacterial material is included in the sealing member 80, so that it may be possible to prevent propagation of bacteria or mold.

Furthermore, the process of fusion-bonding the frames 60 and 70 and the supporting plate 50 may be simplified while reducing the defect rate caused by an assembly error. Consequently, productivity is improved.

As is apparent from the above description, a shelf assembly for a refrigerator according to the embodiment of the present invention not only reinforces a waterproof structure and durability of a shelf, but also improves productivity and reliability since assembly processes are simplified.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A shelf assembly for a refrigerator, comprising:
    a supporting plate;
    an upper frame enclosing an upper part of a peripheral edge of the supporting plate and including an upper groove spaced apart from the peripheral edge of the supporting plate;
    a lower frame enclosing a lower part of the peripheral edge of the supporting plate and including a lower groove spaced apart from the peripheral edge of the supporting plate; and
    a sealing member receiving part generated by the upper and the lower grooves as the upper and the lower frames are interconnected, thereby receiving the peripheral edge of the supporting plate,
    wherein the supporting plate and the upper and the lower frames are fusion-bonded to one another,
    the sealing member receiving part receives a sealing member sealed and bonded to the supporting plate, and at least one of the upper frame and the lower frame,
    wherein the lower groove is formed as a recessed groove between a lower supporting stage and a stepped stage, the lower supporting stage being extended upward from an interior of an upper surface of the lower frame to support a first side of the supporting plate and the stepped stage being disposed at a predetermined interval from the lower supporting stage and stepped at an outer part of the upper surface of the lower frame, and
    the upper groove is formed as a recessed groove between an upper supporting stage and an upper sealing member leakage prevention stage, the upper supporting stage being extended downward from an interior of a lower surface of the upper frame to support a second side of the supporting plate opposite the first side, and the upper sealing member leakage prevention stage being disposed at a predetermined interval from the upper supporting stage and extended from an outer part of the lower surface of the upper frame toward the stepped stage to be fusion-bonded with the lower frame.

2. The shelf assembly according to claim 1, wherein the sealing member receiving part further comprises at least one position fixing protrusion protruded from an inner wall thereof at a position facing an end of the supporting plate.

3. The shelf assembly according to claim 1, wherein the upper and the lower frames comprise locking parts fixing the upper and the lower frames, respectively, so that the supporting plate and the upper and the lower frames are maintained in a preassembled state before being fusion-bonded.

4. The shelf assembly according to claim 1, wherein the sealing member is formed in the lower groove to seal the lower frame and a lower surface of the supporting plate to each other.

5. The shelf assembly according to claim 1, wherein the sealing member is formed in the upper groove to seal the upper frame and an upper surface of the supporting plate to each other.

6. The shelf assembly according to claim 1, wherein the sealing member seals one sidewall of each of the upper and lower grooves and an end of the supporting plate to each other.

7. The shelf assembly according to claim 1, wherein the upper sealing member leakage prevention stage comprises at least one position fixing protrusion extended toward the end of the supporting plate.

8. The shelf assembly according to claim 1, further comprising:
   a lower cover flange formed at an outer part of the lower frame, being extended upward from one end of the stepped stage to be fusion-bonded to the upper frame; and
   an upper cover flange extended downward from an outer part of the upper frame to enclose an outer surface of the lower cover flange at a predetermined interval from the upper sealing member leakage prevention stage.

9. A shelf assembly for a refrigerator comprising a shelf to support an article laid on the shelf, and a shelf supporting member to support the shelf, the shelf assembly being detachably mounted to a storage chamber, wherein:
   the shelf comprises a supporting plate, an upper frame enclosing an upper part of a peripheral edge of the supporting plate, and a lower frame enclosing a lower part of the peripheral edge of the supporting plate;
   the upper frame comprises an upper groove formed between an upper supporting stage extended downward toward the supporting plate and an upper sealing member leakage prevention stage extended downward while being spaced apart from the upper supporting stage, and an upper cover flange extended downward from a peripheral edge of the upper frame while being spaced apart from the upper sealing member leakage prevention stage;
   the lower frame comprises a lower groove formed between a lower support stage extended upward toward the supporting plate and a stepped stage fusion-bonded to the upper sealing member leakage prevention stage, and a lower cover flange extended upward from a peripheral edge of the lower frame such that the lower cover flange is inserted between the upper sealing member leakage prevention stage and the upper cover flange, the lower cover flange being fusion-bonded to the upper frame; and
   a sealing member receiving part is defined by the upper and the lower grooves, and a sealing member is sealed and bonded to the supporting plate, and at least one of the upper frame and the lower frame.

10. The shelf assembly according to claim 9, wherein the shelf is provided at the shelf supporting member such that the shelf is slidably extendable.

11. The shelf assembly according to claim 9, wherein the shelf supporting member comprises fixing parts fixed to both sides of a rear wall of the storage chamber, a pair of supporting parts extended forward from the fixing parts, respectively, and a connection part provided between the supporting parts.

12. The shelf assembly according to claim 11, wherein the supporting parts are provided with guide rails extended forward and backward while being inwardly bent from respective upper surfaces of the supporting parts, and guide slots are provided at both lateral sides of the lower frame, respectively, the guide slots being engaged with the guide rails, respectively.

13. The shelf assembly according to claim 12, wherein stoppers are provided at respective front ends of the supporting parts, to restrict movement of the shelf, and stopper protrusions are provided at the lower frame such that the stopper protrusions are engagable with the stoppers, respectively.

14. The shelf assembly according to claim 9, wherein a locking hook is provided at one of the upper and lower cover flanges, and a locking recess to engage with the locking hook is provided at the other one of the upper and lower cover flanges, to allow the upper and lower frames to be preassembled before being fusion-bonded.

15. The shelf assembly according to claim 9, wherein the sealing member comprises an antibacterial material.

\* \* \* \* \*

UNITED STATES PATENT AND TRADEMARK OFFICE
CERTIFICATE OF CORRECTION

| | | |
|---|---|---|
| PATENT NO. | : 8,529,000 B2 | Page 1 of 1 |
| APPLICATION NO. | : 12/923489 | |
| DATED | : September 10, 2013 | |
| INVENTOR(S) | : Jae Hoon Lim et al. | |

It is certified that error appears in the above-identified patent and that said Letters Patent is hereby corrected as shown below:

In the Claims:

In Column 12, Line 38 (Approx.), In Claim 13, delete "engagable" and insert -- engageable --, therefor.

Signed and Sealed this
Eleventh Day of February, 2014

Michelle K. Lee
*Deputy Director of the United States Patent and Trademark Office*